Figure 1:
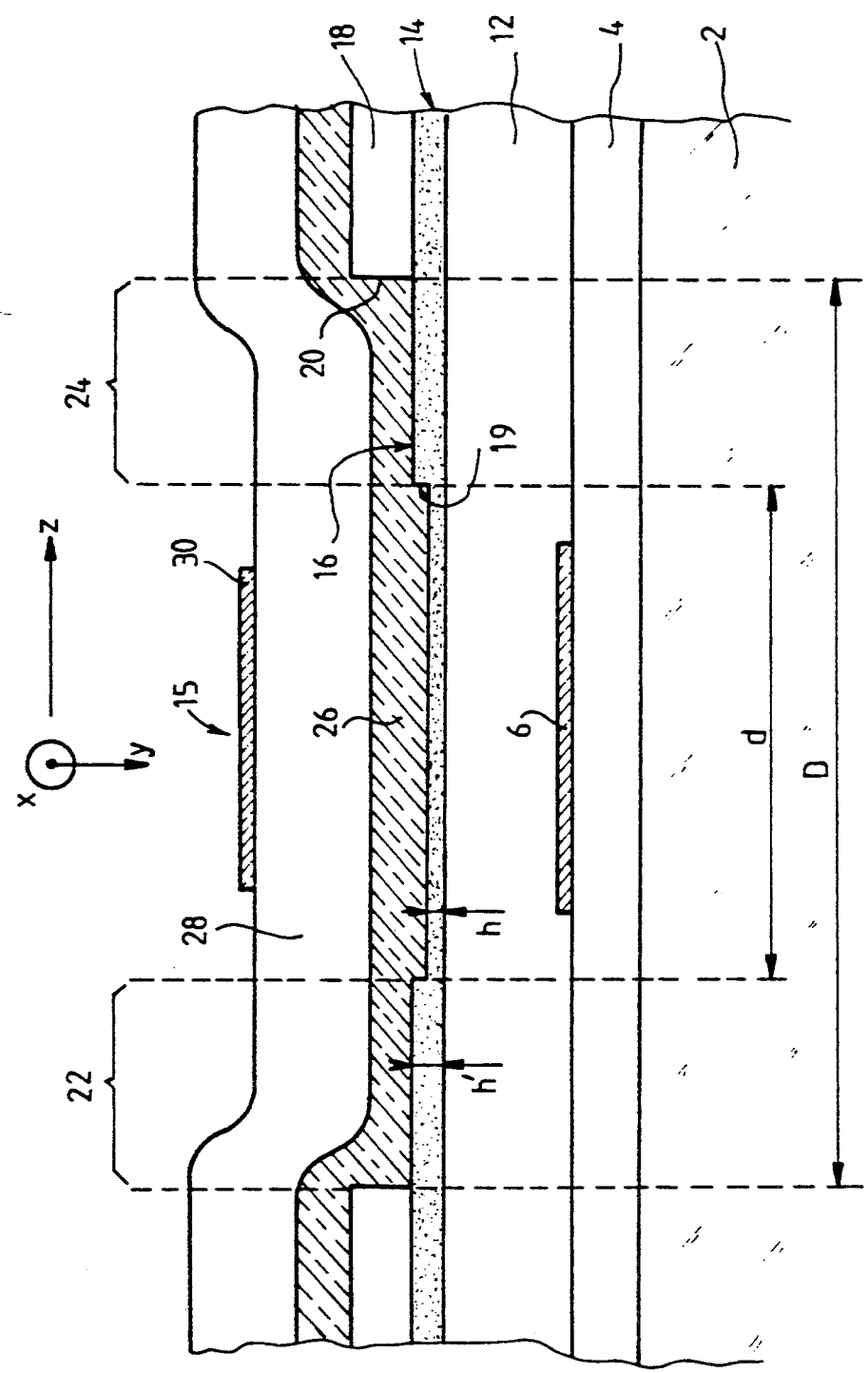

United States Patent [19]
Valette

[11] Patent Number: 5,396,363
[45] Date of Patent: Mar. 7, 1995

[54] INTEGRATED ELECTROOPTIC MODULATOR AND PROCESS FOR THE PRODUCTION THEREOF

[75] Inventor: Serge Valette, Grenoble, France

[73] Assignee: Commissariat a l'Energie Atomique, Paris, France

[21] Appl. No.: 965,711

[22] Filed: Oct. 23, 1992

[30] Foreign Application Priority Data

Oct. 25, 1991 [FR] France ................... 91 13201

[51] Int. Cl.⁶ .............................................. G02B 6/10
[52] U.S. Cl. ................... 359/248; 359/250; 359/252; 385/2; 385/131
[58] Field of Search ............... 359/247, 248, 250, 252, 359/261; 385/2, 131

[56] References Cited

U.S. PATENT DOCUMENTS

| | | | |
|---|---|---|---|
| 4,923,264 | 5/1990 | Langer et al. | 385/2 |
| 4,929,302 | 5/1990 | Valette | 156/657 |
| 5,091,799 | 2/1992 | Sciortino et al. | 359/252 |

FOREIGN PATENT DOCUMENTS 0323317 12/1988 France .

WO91/03748 3/1991 WIPO .

Primary Examiner—Richard A. Bertsch
Assistant Examiner—Charles G. Freay
Attorney, Agent, or Firm—Burns, Doane, Swecker & Mathis

[57] ABSTRACT

Integrated electrooptic modulator and process for the production thereof. This modulator comprises a substrate (2), a guide structure having a guiding layer (14) defining a microguide (16) for the propagation of beams, interposed between the lower and upper layers (12, 18) having indices below that of the guiding layer, a cavity (20) made in the upper layer, an active material such as an active, solid, organic polymer (26), whose index can be electrically modified and which fills the cavity and serves as an optical guide, a confinement layer (28) covering the polymer and the guide structure, the indices of the upper layer and the confinement layer being below that of the polymer, two electrodes placed on either side of the polymer, an electrode (6) being positioned between the lower layer and the substrate and the other electrode (30) is located on the confinement layer.

17 Claims, 9 Drawing Sheets

INTEGRATED ELECTROOPTIC MODULATOR AND PROCESS FOR THE PRODUCTION THEREOF

DESCRIPTION

The present invention relates to an electrooptic modulator using electrooptic materials such as organic polymers, used for integrated optics, as well as to its production process. One particular use is in the field of the real time processing of radar signals, e.g. in correlators, spectrum analyzers or interferometers, in the telecommunications field using the optical route and in the field of optical fibre sensors.

It is pointed out that a waveguide structure generally consists of a buffer layer, a guiding layer and an upper layer stacked on a substrate, the guiding layer having a refractive index higher than that of the buffer and upper layers.

The electrooptical effect makes it possible to modify, under the action of an electrical field, the refractive index of a material and therefore obtain various functions such as the phase or intensity modulation of a light signal, or the polarity change of said signal. Amplitude or phase modulation of light signals at a very high frequency (above 2 GHz) is indispensable for certain optical communications applications.

The amplitude, phase or polarization modulation is indispensable for heterodyning light signals to be processed and thus increasing the performance characteristics of integrated devices of the sensor type (gyrometer, displacement transducer, etc.) or of the optical memory type (polarization modulation of the magneto optic reading heads, etc.). In this case, the modulating frequencies required are generally lower than those for optical communications (a few dozen MHz in metrological devices and beyond 1 GHz for gyrometer-type applications).

The first order electrooptical effect, also known as the Pockels effect, is possible with nonknown symmetrical, crystalline materials, whereas this effect is zero with amorphous materials.

With the deposition methods generally used in integrated optics, silica, silicon oxynitride $SiO_xN_y$ with $0 \leq x \leq 2$ and $0 \leq y \leq 4/3$ and silicon nitride used in integrated optics on silicon (IOS) are amorphous.

It is also impossible to electrically modulate light in the generally used IOS structures. However, increasing importance is being attached to IOS technologies in integrated optoelectronics. There is consequently an interest in producing with such technologies most of the components which are indispensable in optics and to form the most extensive possible library of components.

The aim of the invention is therefore to produce an integrated electrooptic modulator compatible with the IOS structures, i.e. a modulator whose arrangement and nature of the layers still permits an appropriate light guidance. In order to produce this modulator, the inventors have partly replaced one of the materials of the IOS structure by a solid material having electrooptical properties such as an organic polymer.

This replacement must not penalize the overall performance characteristics of IOS structures by strong losses at the interfaces between the conventional IOS structure and the part used for the electrooptical interaction and must occupy a minimum possible space, hence the interest of choosing materials with a strong electrooptical coefficient and must be easy to use.

The general configuration of an electrooptic modulator has long been known. Devices using this type of interaction and employing an organic polymer are constituted by a generally etched electrooptical polymer guiding layer interposed between a buffer layer and a covering layer, whose refractive indices are below that of the electrooptical polymer. These layers not only constitute the active zone of the modulator, but also the entire guide structure associated therewith.

On either side of this stack of layers, there are two electrodes of reduced dimensions making it possible to fulfil two separate functions:

(a) the polymerization of the molecules of the electrooptical polymer, so as to obtain a common orientation of the dipoles of the polymer and obtain the highest possible electrooptical coefficient, said operation taking place before any use of the modulator, at a temperature above the glass transition temperature of the polymer and by applying the highest possible and most uniform possible electrical field to the modulator;

b) the formation of the control electrical field of the modulator during its use.

These generally metallic electrodes must not be seen by the guided light signal, so as to avoid any undesirable absorption of the latter in the electrodes. The thicknesses of the buffer and covering layers must therefore exceed those of the penetration of the evanescent waves in said layers.

Examples of organic polymer electrooptic modulators are e.g. described in the article by G. R. MOHLMANN, ECOC 90-833, "Polymer electrooptic devices" and in the article by H. HAGA et al "Waveguide electro-optic modulator using poled polymer film", p.16.

The organic polymers used in electrooptic modulators are usually deposited with the whirler following mixing in an adequate solvent. Although it is possible to etch these polymers by the dry route, the etching technology associated with said materials is still problematical. The invention more particularly makes it possible to use such materials avoiding the etching thereof in the vicinity of the modulation zone.

In addition, these materials have relatively high optical losses (0.2 to 0.5 dB/cm) comparable to those of IOS structures (0.02 to 0.03 dB/cm), hence the interest of only locally using said materials in IOS structures.

The invention also relates to a electrooptic modulator integrated on a substrate comprising:

a) a guide structure supported by the substrate and having a guiding layer for forming a microguide able to carry the light beams, interposed between a lower layer and an upper layer having refractive indices below that of the guiding layer, the guiding layer and/or the upper layer being etched for the lateral confinement of the light beams in the microguide, b) a cavity made over all or part of the thickness of at least the upper layer and on part only of the length of the guide structure, c) an active solid material, whereof it is possible to electrically modify the refractive index, which fills the said cavity and is able to carry said light beams, d) a confinement layer covering the active material and the solid structure, the refractive indices respectively of the upper layer and the confinement layer being lower than that of the active material, e) two electrodes placed on either side of the active material for modifying its index, a lower electrode placed above the lower layer on the side of the substrate and an upper electrode placed on the outer face of the confinement layer.

The active material with electrooptical properties usable in the invention is in particular an organic polymer of the type described in the articles by G. R. MOHLMANN and H. HAGA referred to hereinbefore or a material such as ZnO or CdS (deposited by cathodic sputtering). These electrooptical materials can be integrated on a silicon substrate and are compatible with IOS structures.

Advantageously, the upper and lower layers are made from silica and the guiding layer of silicon nitride, alumina, silicon oxynitride $SiO_xN_y$ with $0 \leq x \leq 2$ and $0 \leq y \leq 4/3$ or silica.

The upper silica layer, the lower silica layer and the guiding layer when made from silica are not intentionally doped or are doped with doping agents decreasing or increasing their refractive index in such a way that the upper and lower layers have a refractive index below that of the guiding layer.

The reduction of the refractive index of the silica can be obtained by fluorine and/or boron doping and the increase of the index of the silica can be obtained by phosphorus, germanium, titanium or nitrogen doping.

Although the invention more particularly applies to IOS technology, it can also apply to technologies on a III–V material substrate (e.g. GaAs or InP) and in more general terms to guide structures made from inorganic materials, with the exception of the zone occupied by the electrooptically active material.

The lower electrode can be directly placed on the face of the lower layer on the substrate side or even on the rear face of the substrate, provided that the latter is conductive. In order that a silicon substrate is conductive, the latter must be $n^+$ or $p^+$ doped. The latter arrangement can be used when, during manufacture of the modulator, there are one or more high temperature stages (annealing or creep) which cannot be withstood by the lower electrode and the latter can then be produced after said high temperature stages. However, the latter solution is penalizing from the standpoint of the modulation speeds which can be attained as a result of the higher electrical resistance and capacitance values of the modulator.

It is also preferable to place the lower electrode on the face of the lower layer on the substrate side and interpose between the lower electrode and the substrate, when the latter is a mediocre dielectric, a buffer layer. The buffer layer preferably has a refractive index equal to or lower than that of the lower layer of the guide structure.

The modulation zone is produced in such a way that the profile of the guided mode used in the structure is as close as possible to that obtained in the guide structure.

Preferably, the cavity is made over the entire thickness of the upper layer and on at least part of the guiding layer.

The invention also relates to a process for the production of a modulator of the type defined hereinbefore and which comprises the following stages:

A) producing the lower electrode below the lower layer on the substrate side.

B) successive depositions of the lower layer, the guiding layer and the upper layer, C) etching the guiding layer and/or the upper layer to at least form the microguide, D) etching the upper layer to at least partly form the cavity, E) successive depositions of the active material and the confinement layer on the complete structure obtained in D), F) producing the upper electrode in front of the cavity.

The microguide can be formed either by etching the guiding layer or by etching the upper layer or by both. When it is solely defined in the guiding layer, the etching of the guiding layer takes place before the deposition of the upper layer.

In this process, the lateral confinement of the light is carried out without having to modify the layer of active material following its deposition. In particular, the latter does not have to be etched in order to ensure the lateral confinement in the modulation zone, unlike in the prior art.

The modulator according to the invention makes it possible to associate with minimum losses the passive parts constituted by the guide structure and the active parts constituted by the electrooptical material-filled cavity. To this end, adiabatic transitions are advantageously provided between the guide structure and the active zone of the modulator. In other words, the guiding layer, which may or may not be etched in the guide structure, has etched ends facing the cavity. These ends have a width which decrease progressively over a given thickness (equal to or below the guiding layer thickness), the latter being shaped like a cone in plan view.

The upper and lower electrodes are made from metal, e.g. aluminium or gold.

In the case where the modulators according to the invention have to operate at very high speed and where high temperature stages are necessary for producing said modulators, the lower electrode can be made from a silicide of a refractory metal and in particular tungsten, cobalt or molybdenum silicide, which are well known in the microelectronics field and which are able to withstand high temperature processes.

The confinement layer is advantageously made from a polymer such as polymethyl methacrylate (PMMA) or polyimides with a refractive index between 1.45 and 1.7.

The invention is described in greater detail hereinafter relative to non-limitative embodiments and with reference to the attached drawings, wherein show:

FIG. 1 Diagrammatically and in longitudinal section, a first embodiment of an electrooptic modulator according to the invention.

Figure 2:
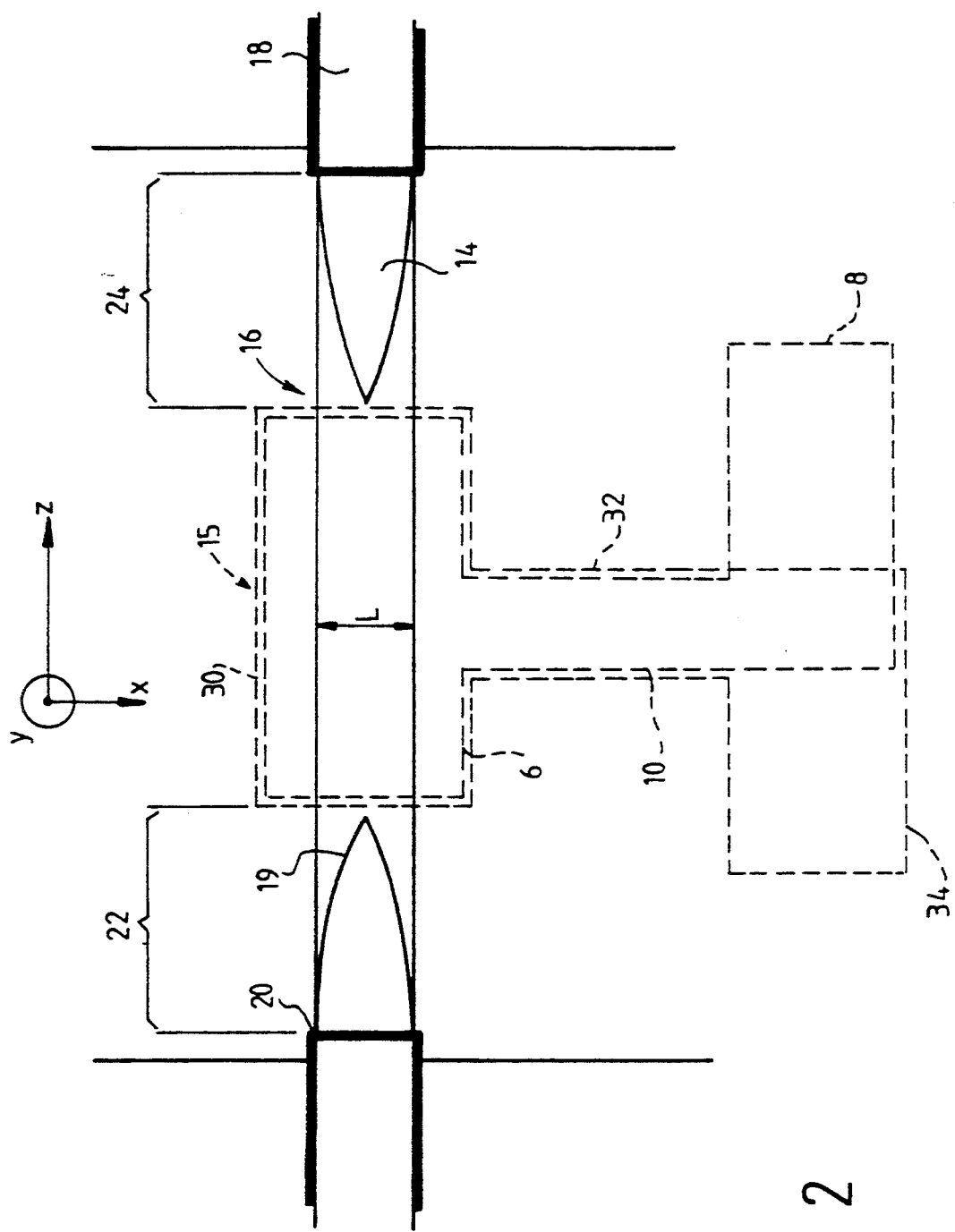

FIG. 2 Diagrammatically a plan view of the modulator of FIG. 1.

Figure 3:
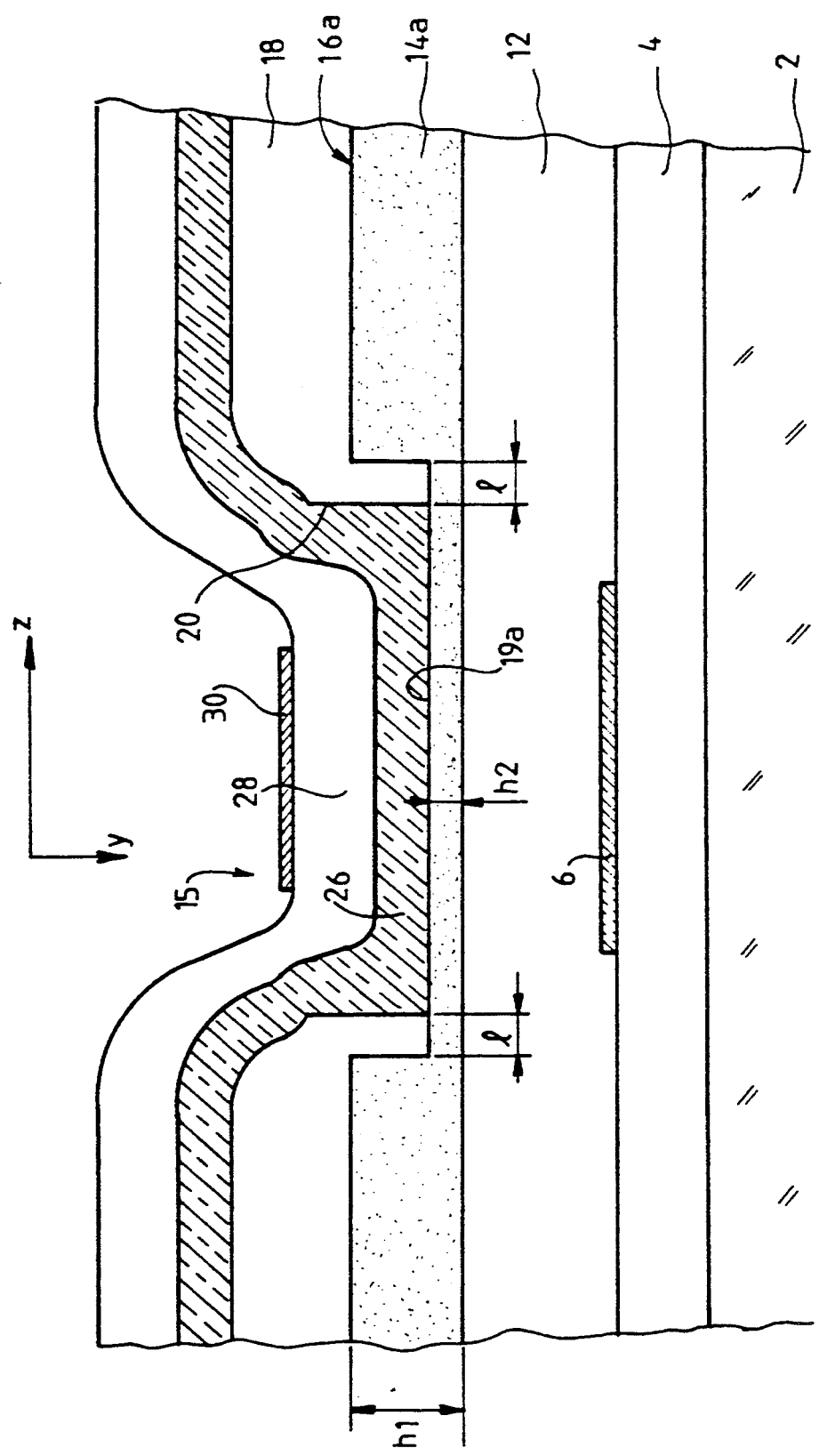

FIG. 3 Diagrammatically and in longitudinal section, a second embodiment of a modulator according to the invention.

Figure 4:
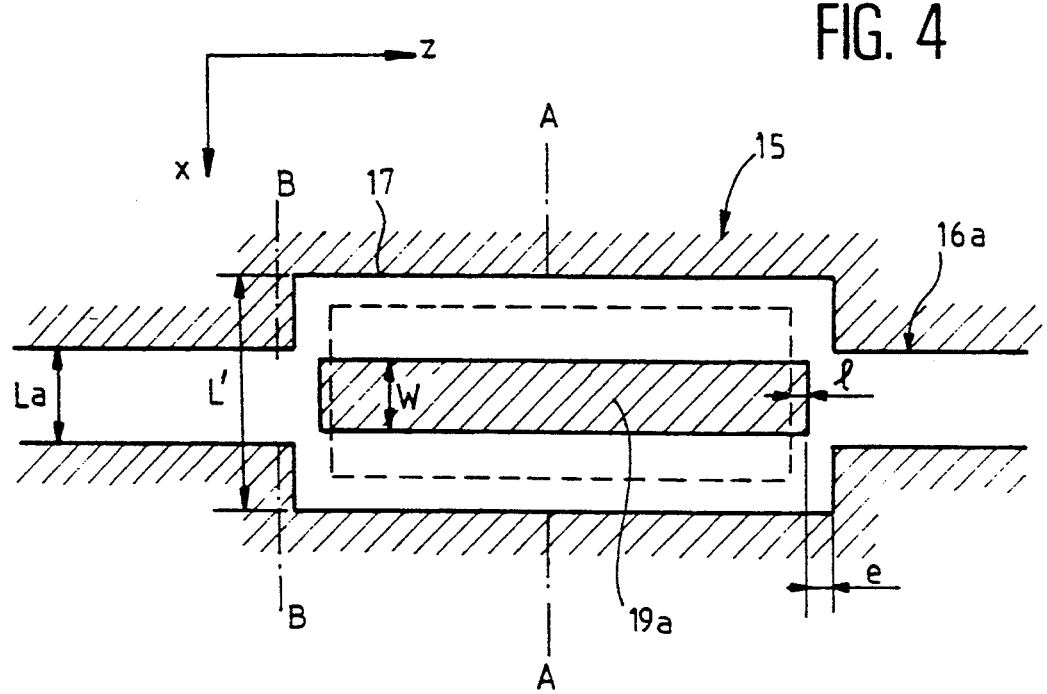
Figure 5:
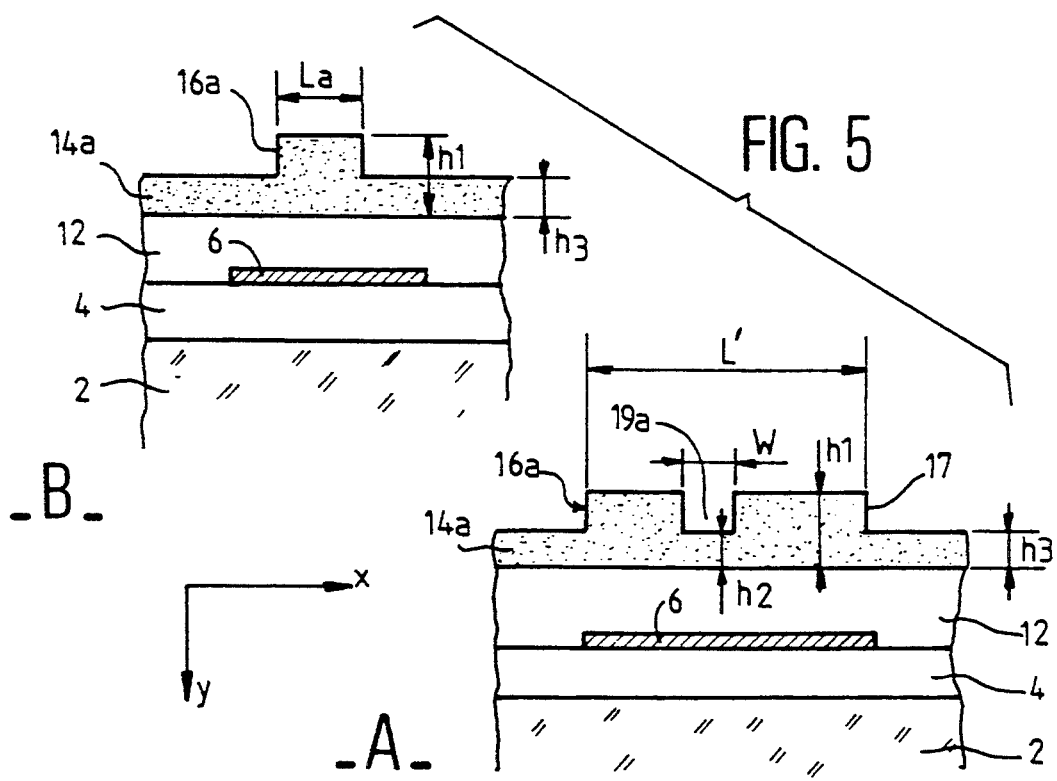

FIG. 4 A plan view of the modulator of FIG. 3, part A of FIG. 5 relating to a variant.

FIGS. 5 to 8 Diagrammatically and in cross-section, illustrate the different stages of the production of the modulator according to FIG. 3, part A of FIG. 5 relating to a variant.

FIGS. 9 to 14 Diagrammatically illustrate the different stages of the production of a third embodiment of an electrooptic modulator according to the invention.

Figure 9:
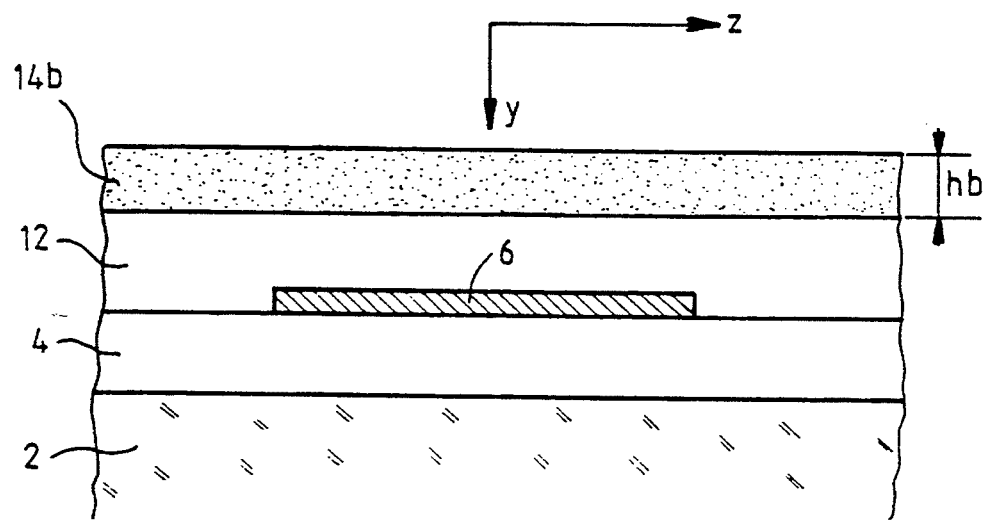
Figure 10:
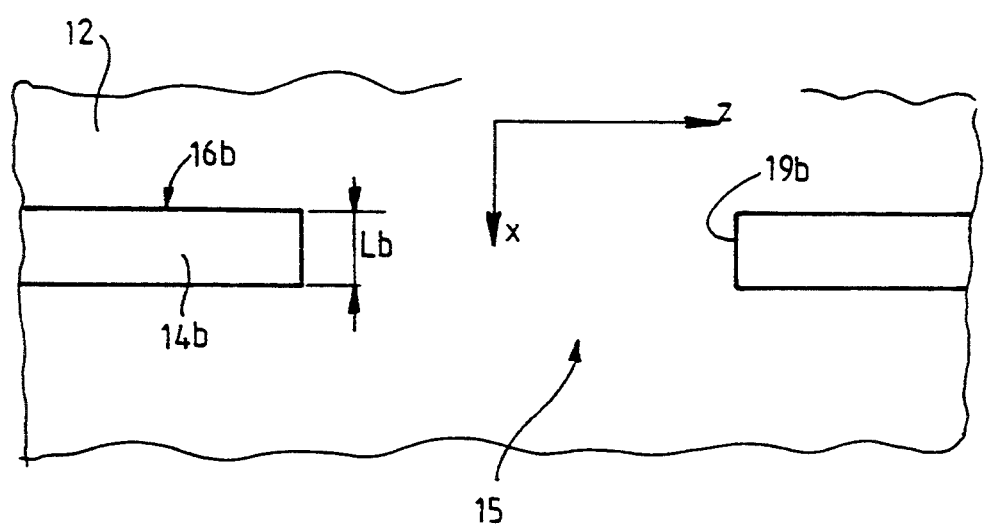
Figure 11A:
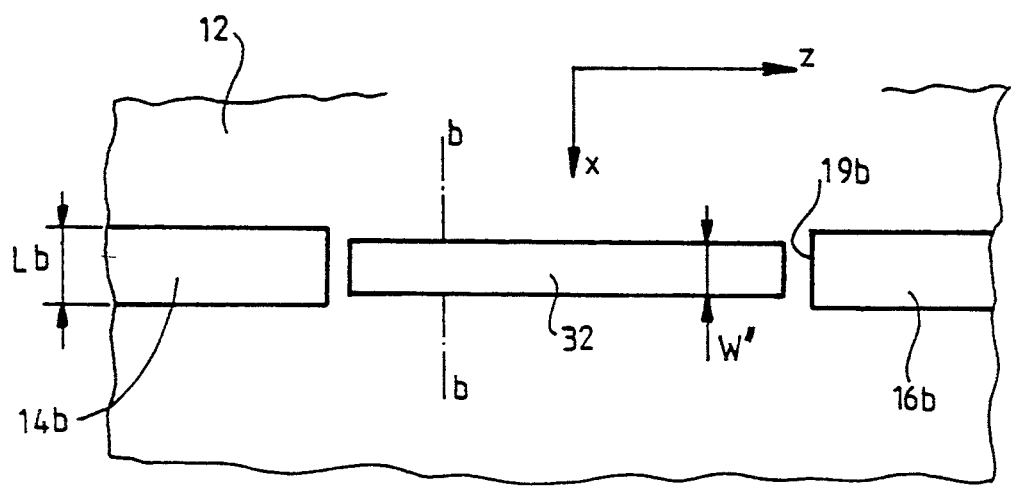
Figure 11B:
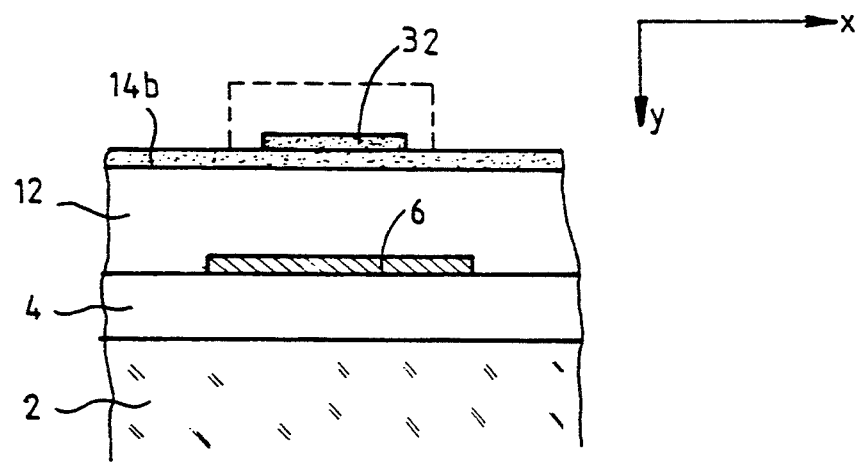
Figure 12A:
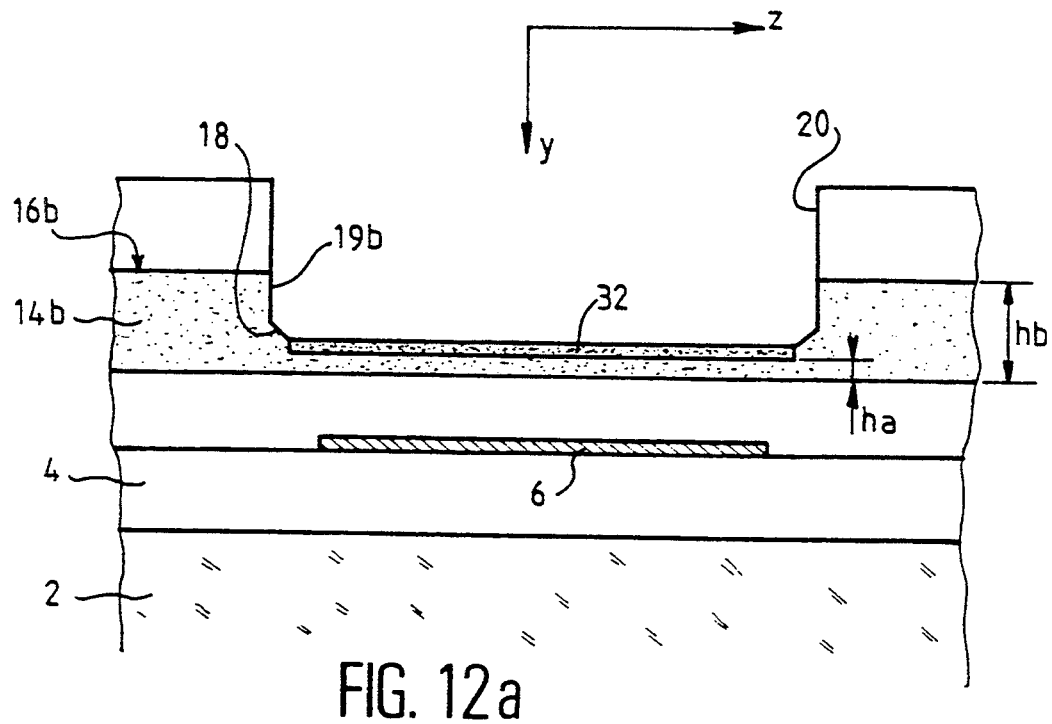
Figure 12B:
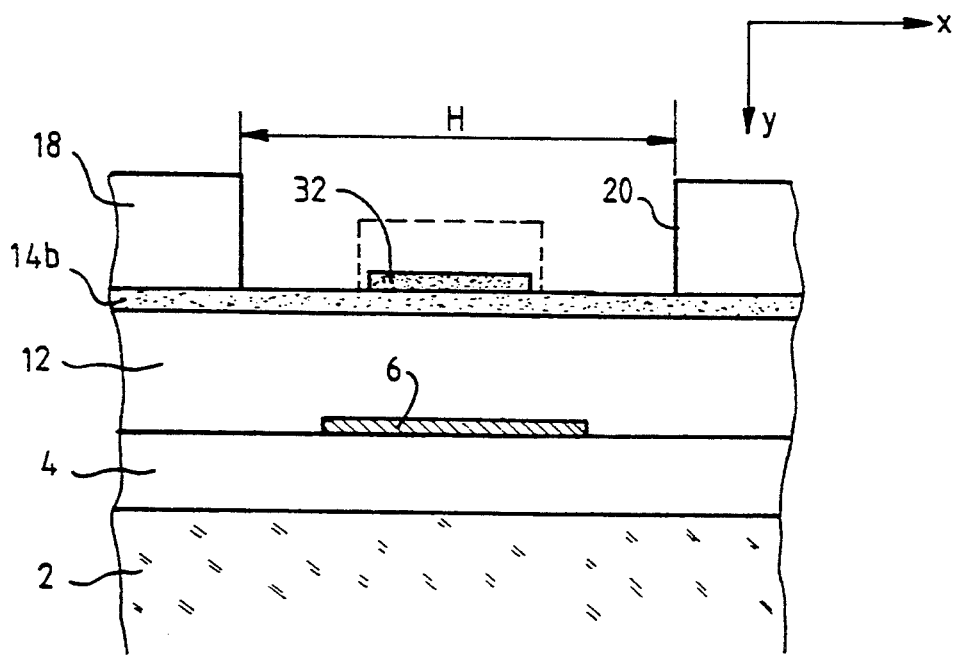
Figure 13:
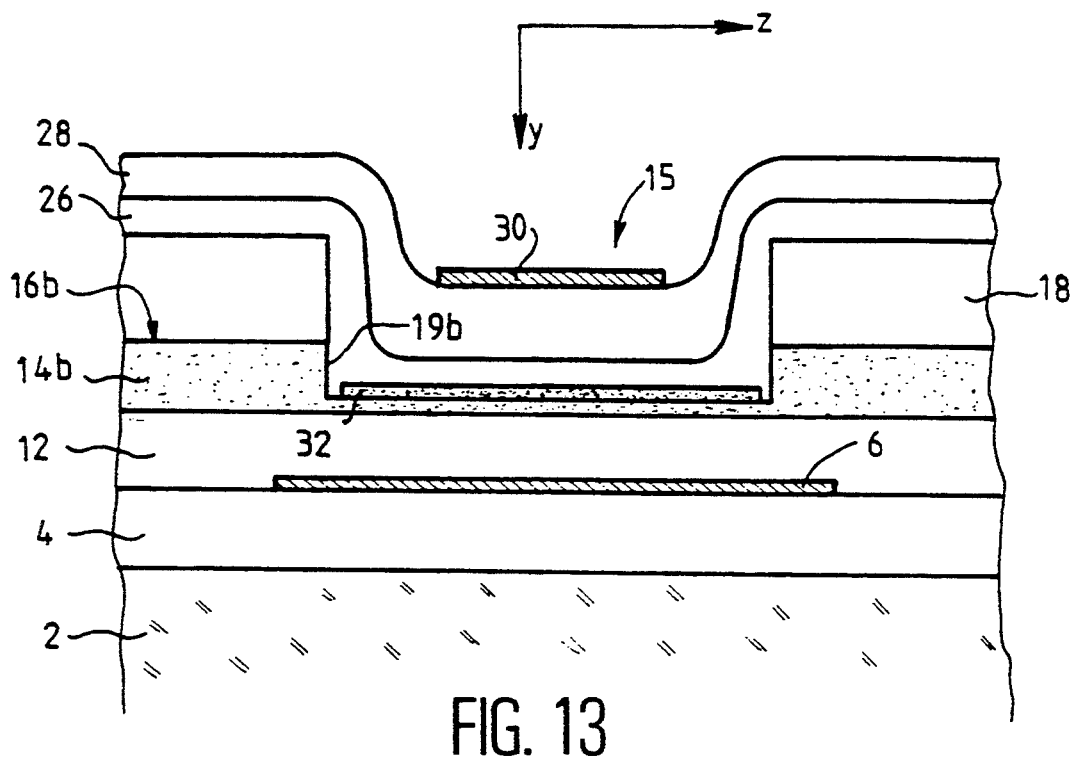
Figure 14:
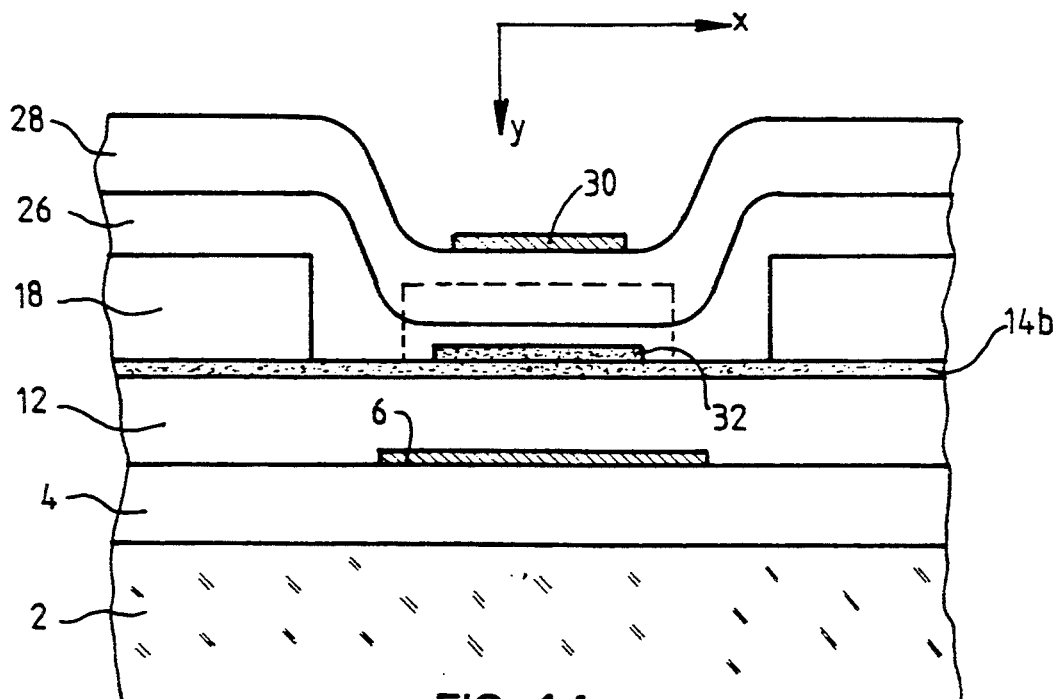

FIGS. 9, 12a and 13 Are longitudinal sectional views,
FIGS. 10 and 11a Plan views and
FIGS. 11b, 12b and 14 Are cross-sectional views.

In the remainder of the description, the $Si/SiO_2/Si_3N_4/SiO_2$ guide structure will be referred to as the IOS1 structure, the $Si/SiO_2$/high index $SiO_2/SiO_2$ guide structure will be referred to as the IOS2 structure and the $Si/SiO_2/Si_3N_4$/high index $SiO_2/SiO_2$ will be called the IOS3 structure. In addition, the example will be used of an organic polymer as the active material. The refractive indices will be given for a wavelength of 800 nm.

The modulator according to the invention shown in FIGS. 1 and 2 advantageously uses an IOS1 structure. This modulator has a monocrystalline silicon substrate 2 covered with a 0 to 3 micrometer thick, not intentionally doped silica layer 4 obtained by thermal oxidation at between 1000° and 1100° C. at atmospheric pressure or about 700° to 800° C. under high pressure (HIPOX) of the substrate or by chemical vapour phase deposition (CVD). The undoped silica has a refractive index of 1.45. The $SiO_2$ layer 4 rests on a lower electrode 6 made from metal or a silicide of a refractory metal and having a thickness of 50 to 500 nm. This layer 4 makes it possible to isolate the electrode from the substrate.

This lower electrode 6 has in the plane xz rectangular layers. An electrical contact zone 8 (cf. FIG. 2) connected by a conductive strip 10 to the electrode 6 permits the application of a potential to said electrode. In practice, the electrode 6, its electrical contact 8 and its connection 10 are produced in the same layer deposited on the silica 4 and then etched by conventional photolithography processes to give the desired pattern.

The lower conductive layer 6-8-10 is covered with a 2 to 15 micrometer thick, not intentionally doped $SiO_2$, lower confinement layer 12 obtained by chemical vapour deposition, optionally assisted by a plasma (PECVD). The thickness of said layer 12 is adequate to insulate the light, guided in the structure, from the lower electrode 6.

On the lower confinement layer 12 is provided a silicon nitride guiding layer defining a microguide 16 parallel to the direction z (longitudinal direction). This microguide will carry the light beams in the guide structure. The guiding layer is deposited by CVD and generally by low pressure chemical vapour deposition (LPCVD). The guiding layer could also be made from silicon oxynitride $SiO_xN_y$ with $0 \leq x \leq 2$ and $0 \leq y \leq 4/3$, or from alumina.

The refractive index of $SiO_xN_y$ varies from 1.46 to 2 as a function of the values of x and y. The index of $Si_3N_4$ is close to 2 and that of alumina is approximately 1.65.

According to the invention, the microguide 16 has in and in the vicinity of the modulation zone 15 (the modulation zone being defined by the zone facing the lower electrode 6), a pattern laterally etched in accordance with the axis Z over a width L between 2 and 8 $\mu$m and a length D. In the modulation zone said pattern has a longitudinal recess 19, whose axis of symmetry coincides with that of the microguide. Thus, the microguide 16 has a thickness h in the modulation zone 15 and outside the modulation zone has a thickness h' with $h<h'$.

The lateral etching of the pattern and its thickness difference are obtained by at least two dry etching operations on the microguide 6 using photolithographic masks defining the desired pattern.

The thickness h is such that the lateral confinement in the modulator of the guided zone is ensured for the chosen width L. The latter is dependent on the index difference between the guiding layer 14 and the adjacent layers, as well as the wavelength used, together with the number of guided modes which it is wished to carry. This guide structure can e.g. be monomodal both in the direction x parallel to the plane of the layers (transverse direction) and the direction y perpendicular to the plane of the layers.

For a $Si_3N_4$ guiding layer 14 and a monomodal structure, h is e.g. chosen between 10 and 50 nm and h' between 60 and 250 nm for the previously given values of L and an electrooptical material of refractive index 1.55.

The electrooptic modulator also has an upper confinement layer 18 made from not intentionally doped silica deposited by CVD. The thickness of the layer 18 is 1 to 10 micrometers. It ensures the lateral confinement of the light in the guiding layer 14 by the lateral etching of the layer 18 over a width close to L and with the same axis as the etched pattern of the layer 14.

According to the invention, said confinement layer 18 has a cavity 20 produced by etching the layer 18, particularly by the dry route, at the same time as its lateral etching and over the entire thickness of the layer 18. The cavity 20 is positioned facing the modulation zone 15 and in particular the recess 19. Thus, it defines one and the same cavity with the recess 19, defined in the two directions x and z (FIG. 2) parallel to the layers. The cavity 20 has a width D exceeding the minimum width d of the recess 19.

According to the invention, the edges of the microguide recess 19 (FIG. 2) have, in plan view, the shape of a cone of thickness h'-h.

Thus, according to the invention, the zones 22 and 24 separating the edges of the recess 19 from the edges of the cavity 20 define two adiabatic transitions. These adiabatic transitions permit a passage without optical loss between the guide structure IOS1 and the active structure (electro-optical organic polymer).

The two adiabatic transition zones 22, 24 can be produced in the manner described in Appl. Phys. Lett., 55 (23), 4.12.1989, pp.2389–2391 by Y. SHANI et al "Efficient coupling of a semiconductor laser to an optical fiber by means of a tapered waveguide on silicon".

Thus, there is a solid, organic polymer layer 26 having electrooptical properties covering the complete underlying structure. The use of a cavity makes it possible to avoid the etching of said polymer, which is generally difficult to carry out particularly in the modulation zone, for the lateral confinement of the light in said modulation zone. The polymer layer 26 is deposited with the whirler following mixing in an adequate solvent and is then dried in the ambient air. The active layer 26 has a thickness of 0.2 to 5 micrometers.

The active polymer layer 26 is covered over its entire surface by a generally inactive, organic polymer, confinement layer 28, which is also deposited with the whirler and then dried. This polymer layer 28 has a thickness of 1 to 10 micrometers. The confinement layer 28 is advantageously not etched, like the active layer 26, in the modulation zone.

The organic polymers have refractive indices between 1.46 and 1.7 and are not able to withstand temperatures generally exceeding 150° C.

In order to guide the light in the active polymer 26, the latter must have a refractive index higher than that of the confinement polymer layer 28, the upper silica layer 18 and the lower silica layer 12. In particular, the active polymer is PMMA doped by 2-methyl-4-nitroaniline (MNA). This polymer has an index of 1.55. The confinement layer 28 is made from undoped PMMA with an index of 1.50.

Finally, on the polymer layer 28 there is an upper electrode 30 arranged parallel to the lower electrode 6 and facing the latter. In plan view, the electrode 30 is shaped like a rectangle and is connected by means of a conductive strip 32 to an electrical contact zone 34.

The electrode 30, the conductive strip 32 and the contact zone 34 are produced in the same conductive layer, from metal or a refractory metal silicide, followed by etching in accordance with the desired pattern using photolithography.

In order to ensure contacting on the lower electrode 6, it is necessary to make a contact hole in the stack of layers 28, 26, 18 and 12 having a relatively large surface of 1000 micrometers squared or more, facing the electrical contact zone 8. It is not a difficult operation to make this contact hole.

With reference to FIGS. 3 and 4 a description will now be given of a second embodiment of the electrooptic modulator according to the invention and with reference to FIGS. 5 to 8 its production process will be described relative to two variants. The basic structure is advantageously an IOS2 structure.

The layers and elements of the modulator in FIGS. 3 to 8 which are identical to those of FIGS. 1 and 2 will carry the same references.

The modulator of FIGS. 3 and 4 has, on the substrate 2, the thermal silica layer 4, the lower electrode 6 obviously connected to its not shown contact zone and the silica confinement layer 12 which is not intentionally doped or is optionally doped with a doping agent reducing (F, B) or increasing (e.g. P, Ge or Ti) its refractive index. These layers and electrode are produced in the manner described hereinbefore.

The lower confinement layer 12 is covered with a silica guiding layer 14a optionally doped with a doping agent increasing or decreasing its refractive index. This guiding layer 14a is deposited by CVD in accordance with a thickness h1 and is then etched (FIG. 4) to define the microguide 16a parallel to the direction z.

The lower electrode 6 has in general a size close to that of the upper electrode 30. However, as the electrical field must be uniform in the modulation zone 15, it is of interest to use electrodes with a slightly larger size than that of the light confinement zone.

In the modulation zone 15, the microguide 16a has a widening 17. The width L of said widening varies from 10 to 1000 $\mu$m. Outside the modulation zone, said microguide 16a has a width La of 3 to 5 micrometers. The etching of the guiding layer 14a takes place by the dry route in accordance with the desired pattern using conventional photolithography processes.

The IOS2 guide structure is terminated by an upper confinement layer 18 of silica, which is not intentionally doped, or is doped by a doping agent decreasing or increasing its index.

The doping of the silica of the layers 12, 14a and 18 must be such that the refractive index of the guiding layer 14 exceeds that of the layers 12 and 18.

According to the invention, the microguide 16a has in the modulation zone and therefore in its widening 17, a longitudinal recess 19a, whose axis of symmetry coincides with that of the axis of the microguide 16a. This recess 19a is completely included within the widening 17. The width e separating the recess 19a from the microguide 16a in its least wide part, is advantageously small and typically approximately 5 to 20 $\mu$m. The width w of the recess 16a varies from 1 to 4 $\mu$m.

Figure 6:
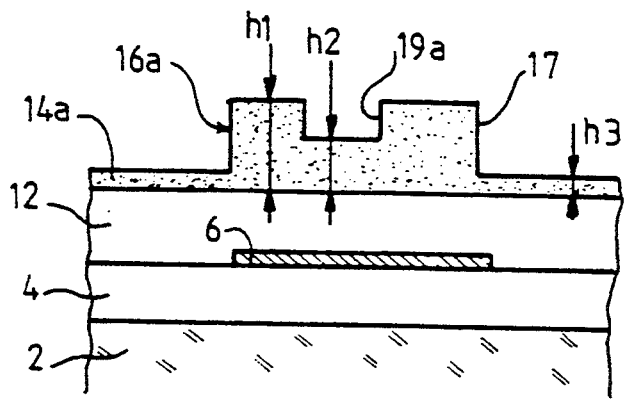

The profile of the etched pattern in the guiding layer 14a prior to the deposition of the layer 18 is shown in parts A and B of FIG. 5 and in FIG. 6. Part A of FIGS. 5 and 6 are sections along line A—A of FIG. 4 and part B of FIG. 5 is a section along line B—B of FIG. 4, which is close to the start of the recess 17.

The recess 19a interrupts the microguide 16a of width La in the modulation zone 15. In said zone 15 it will permit the replacement of the passive microguide 16a by an active polymer microguide, which will occupy the recess 19a.

If a single photolithographic mask is used for producing the microguide 16a and the recess 19a, it is clear that in the modulation zone the heights $h_2$ and $h_3$ of the layer 14a are equal (part A of FIG. 5).

This manner of proceeding has the advantage of bringing about a perfect alignment between the axis of the recess 19a and that of the microguide 16a. However, it limits the freedom of adaptation of the profile of the guided mode in the microguide 16a of width L' and that of the guided mode in the active polymer microguide which will replace the recess 19a (the refractive indices of doped silica and polymers are generally different). Thus, there are generally slight light losses at the transition.

Figure 7:
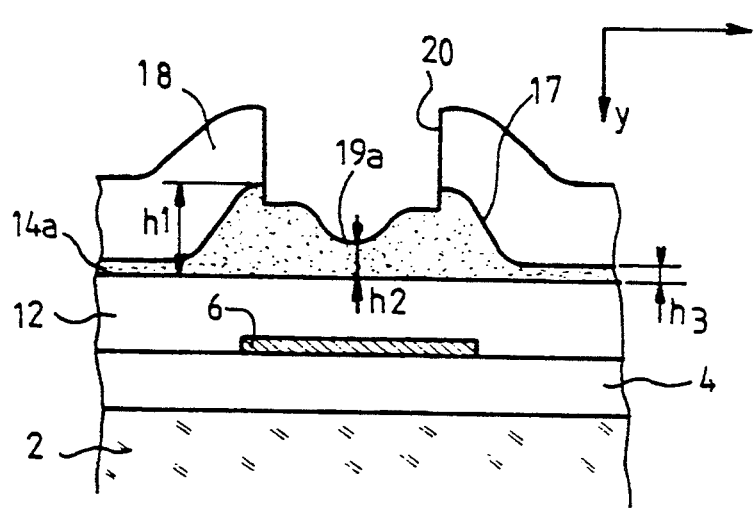
Figure 8:
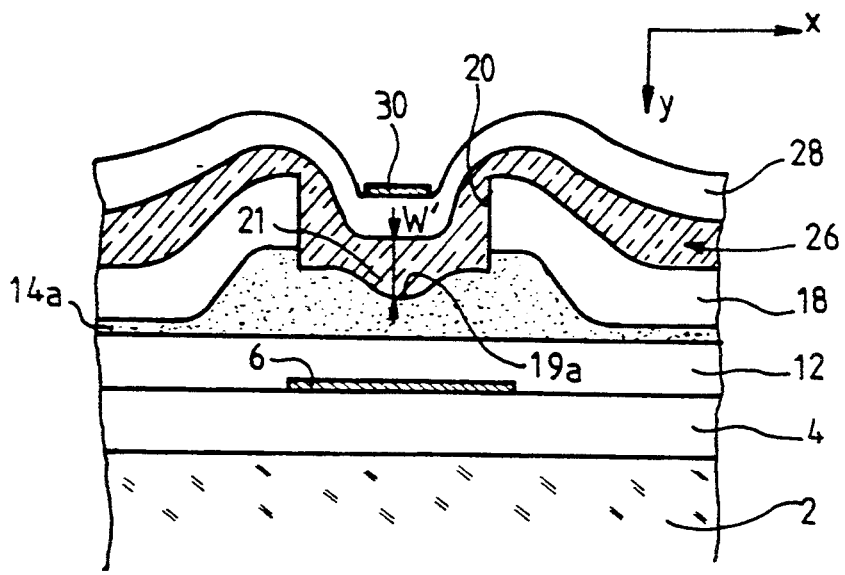

With two mask levels, one for producing the microguide 16a and the other for producing the recess 19a, there is a freedom to choose $h_2$ different from $h_3$, as shown in FIGS. 6, 7 and 8, and therefore adapt the two mode profiles. In this case, $h_2$ is calculated on the basis of the parameters of the microguide 16a and particularly the refractive index of the active polymer 26 used. However, the use of two mask levels, apart from the fact that it complicates the technology, generally leads to a slight misalignment of the axes of the microguide 16a and the recess 19a. Thus, there would also be a slight light loss at the transition, but for a different reason. $h_3$ can also be chosen as zero.

When use is made of two mask levels $h_2$ can in certain cases be chosen negative (i.e. the confinement layer 12 is slightly etched. Moreover, the height $h_2$ of FIG. 7 is not necessarily equal to that of FIG. 5, part A or FIG. 6, because it is possible to slightly etch the layer 14a during the production of the cavity 20.

For an index difference of $10^{-2}$ (the case with the undoped $SiO_2$ layers 12 and 18 and a highly doped $SiO_2$ microguide 16a), $h_1$ is chosen such that $0.5 \ \mu m < h_1 < 3$ $\mu$m for a wavelength of 800 nm. For an index difference of $6 \cdot 10^{-3}$ (case of undoped $SiO_2$ layers 12 and 18 and the moderately doped $SiO_2$ microguide), $h_1$ is chosen such that $2 \ \mu m < h_1 < 8 \ \mu m$ for a wavelength of 1.55 $\mu$m.

The height $h_2$ is also dependent on the type of confinement desired and can vary from 0 to 3 $\mu$m according to the value of $h_1$, the index difference between the guiding layer and the adjacent layers and the width La of the microguide 16a. For an index difference of $10^{-2}$, a wavelength of 800 nm and $h_1$ equal to 2 $\mu$m, $h_2$ can vary from 0 to 1 $\mu$m in exemplified manner.

$h_3$ generally only differs slightly from $h_2$, i.e. approximately 0 to 1 $\mu$m for an index difference of $10^{-2}$ and a wavelength of approximately 800 nm.

Usually $h_3$ is made slightly smaller than $h_2$, when $h_3 \neq h_2$, because the guided mode in silica is generally less confined than the guided mode in the active guide (the index difference in the silica guide generally being smaller than that of the polymer guide). For example, with an active material having an index of 1.55 and a layer 28 of index 1.50, $h_3$ can vary in the given example from 0 to 0.6 μm.

Following the etching of the guiding layer 14a in accordance with the pattern of FIG. 5 or 6, it is advantageous to carry out high temperature annealing, in order to bring about a slight creep of the guiding layer and thus soften or smooth off the etched steps, as shown in FIG. 7. This annealing can be carried out at 1200° C. in an oxygen or argon atmosphere.

The thus annealed guiding layer is then covered with the upper, silica confinement layer 18, which is etched so as to form the cavity 20. The latter is formed facing the widened zone 17 of the microguide 16a and with the recess 19a constitutes a single cavity defined in the two directions x and z parallel to the plane of the layers and which will permit the lateral confinement of the light in the organic polymer microguide having electrooptical properties, in the central zone 21 of the modulator and in particular in the recess 19a.

The cavity 20 is made in such a way that the edges of the recess 19a of the microguide 16a are covered with undoped silica 18 (FIG. 3). The thickness 1 of the undoped silica on the edges is not critical and varies from 0 to 5 μm.

The deposition of the solid, organic, electrooptical polymer layer 26 and then the polymeric confinement layer 28 on the structure obtained can then be carried out in the aforementioned manner.

The modulator is terminated by the formation of the upper electrode 30, as described hereinbefore.

The final structure, in cross-section, is that shown in FIG. 8. In this modulator, the light is confined in the central region 21 of the polymeric guide as a result of the thickness W' of the active polymer, which is greater than that of the adjacent regions.

The structure of the modulator shown in FIGS. 3, 4 and 8 is much more complex than that shown in FIGS. 1 and 2 using a guided IOS1 structure and this is due to the small index difference ($10^{-2}$ or $10^{-3}$) between the guiding layer 14a and the confinement layers 12 and 18, as well as the much greater thicknesses used in the IOS2 structure.

However, it is possible to simplify the production of the modulator in the IOS2 structure by using a very thin layer 32 of a material having a high index difference, namely $Si_3N_4$, $Al_2O_3$ or silicon oxynitride, as shown in FIGS. 9 to 13, under the organic, active polymer.

In this case, the modulator according to the invention still has (FIG. 9) on the substrate 2, the silica layer 4, the lower electrode 6 (with its electrical contact zone), the lower, silica confinement layer 12 and the highly doped silica guiding layer 14b of thickness $h_b$. These layers and electrode are formed in the aforementioned manner.

This is followed by a complete or partial etching of the guiding layer 14b in accordance with the pattern shown in plan view in FIG. 10, in order to form the microguide 16b of the guide structure. Lb indicates the width of the microguide 16b. This microguide has a recess 19b in the modulation zone. This recess can be made over all or part of the thickness of the microguide 16b, which corresponds to a thickness $h_a \leq 0$ (FIG. 12a).

This is followed by the deposition of a 10 to 50 nm thin silicon nitride layer, or optionally a layer of alumina or silicon oxynitride. This layer is deposited by PECVD or LPCVD, or possibly cathodic sputtering or even evaporation.

This is followed by an etching of the layer so as to obtain the pattern 32 shown in plan view in FIG. 11a. This pattern is in the form of a strip, whose longitudinal axis coincides with that of the microguide 16b, said strip being entirely located in the recess 19b of the microguide 16b.

The width w" of the pattern 32 is close to the microguide width Lb, but is generally slightly less than the latter, bearing in mind the indices of the materials chosen and the wish to remain monomodal. In particular, w" is 2 to 8 μm.

The profile obtained along line b—b in FIG. 11a is shown in FIG. 11b.

The complete structure is then covered by the upper, $SiO_2$ confinement layer 18, followed by the formation of the cavity 20 limited in the directions x and z parallel to the layers by etching the layer 18 up to the high index layer 14b or stopping very slightly above the high index layer (e.g. 0.1 μm) to take account of the etching uncertainties and so as not to etch the high index layer.

As shown in FIGS. 12a and 12b, respectively in longitudinal and cross-section, said cavity 20 is positioned facing the high index material strip 32. The width H of said cavity exceeds the width w" (approximately 2 to 8 μm) of the profile 32 and for the chosen materials and is between 20 and 100 μm. In this embodiment, the edges of the recess 19b (FIG. 12a) are not covered by undoped silica.

This is followed by the deposition of the electrooptical polymer layer 26 and then the polymer layer 28 and the upper electrode 30 of the electrooptical modulator is formed. FIGS. 13 and 14 show the final structure of this modulator, respectively in longitudinal and cross-section.

The order of the etching and deposition operations described hereinbefore with reference to FIGS. 9 to 14 can optionally be very slightly different, e.g.:

1°) etching the guiding layer 14b, as shown in FIG. 10,
2°) deposition of the upper, $SiO_2$ confinement layer 18,
3°) etching of said layer 18 to form the cavity 20,
4°) deposition of the high index alumina, silicon nitride or $SiO_xN_y$ layer,
5°) etching said layer to obtain the pattern 32. The other operations are identical to those described hereinbefore and the final structure is similar to that shown in FIGS. 13 and 14.

I claim:

1. An electrooptic modulator integrated on a substrate, comprising:
a guide structure supported by the substrate, including:
a lower layer;
an upper layer;
a guiding layer formed between the lower layer and the upper layer and having a refractive index greater than a refractive index of the lower layer and greater than a refractive index of the upper layer, the guiding layer forming a light-beam microguide in which light beams are confined to propagate in a predetermined direction of propagation;
a cavity formed within the upper layer and extending for only part of a length of the guide structure in the direction of propagation;

an active layer of light-transmitting active solid material deposited within the cavity, the active solid material exhibiting a refractive index that changes in response to an applied electrical signal;

a confinement layer covering the active material and the guide structure and having a refractive index lower than the refractive index of the active material; and a lower electrode separated from the active layer by the lower layer and an upper electrode separated from the active layer by the confinement layer, the electrical signal being applied between the lower electrode and the upper electrode.

2. The apparatus of claim 1, wherein the cavity extends to a depth within the guiding layer.

3. The apparatus of claim 2, wherein the guide layer is etched to define a first adiabatic transition region between the guide layer and a first end of the cavity in the direction of propagation and a second adiabatic transition region between a second end of the cavity in the direction of propagation and the guide layer.

4. The apparatus of claim 1, further comprising a buffer layer provided between the lower electrode and the substrate.

5. The apparatus of claim 1, wherein the active solid material is an organic polymer.

6. The apparatus of claim 1, wherein the guiding layer is etched so as to increase in width at a first end of the cavity in the direction of propagation.

7. The apparatus of claim 1, wherein the confinement layer comprises a solid organic polymer.

8. The apparatus of claim 1, wherein the substrate and upper and lower layers comprise inorganic materials.

9. The apparatus of claim 1, wherein the substrate is made from silicon, the upper layer and the lower layer are made from silica, and the guiding layer is made of a material chosen from the following group: silica, silicon nitride, alumina, or silicon oxynitride $SiO_xN_y$ with $0 \leq x \leq 2$ and $0 \leq y \leq 4/3$.

10. The apparatus of claim 1, wherein the cavity is deeper along a central axis of the cavity in the direction of propagation than in adjoining regions.

11. The apparatus of claim 1, further comprising a layer of material provided within the cavity between the active material and the guiding layer and having a refractive index higher than the refractive index of the guiding layer and the refractive index of the active material.

12. The apparatus of claim 11, wherein the guiding layer is made from silica and layer of material provided within the cavity between the active material and the guiding layer is made from one of silicon nitride, silicon oxynitride and alumina.

13. The apparatus of claim 1, wherein the guiding layer has a thickness in a vicinity of the cavity such that propagation of light beams through the guide structure remains monomodal in a plane defined by the direction of propagation and a direction perpendicular to each layer.

14. A method of forming an electrooptic modulator on a substrate, comprising the steps of:

A) depositing a lower electrode above the substrate in a modulation region;

B) successively depositing of a lower layer, a guiding layer and an upper layer to form a guide structure, wherein the guiding layer has a refractive index greater than a refractive index of the lower layer and greater than a refractive index of the upper layer;

C) etching at least one of the guiding layer and the upper layer to form a lightbeam microguide in which light beams are confined to propagate in a predetermined direction of propagation;

D) etching the upper layer to form a cavity within the upper layer extending for only part of a length of the guide structure in the direction of propagation;

E) depositing within the cavity a light-transmitting active solid material exhibiting a refractive index that changes in response to an applied electrical signal;

F) depositing over the active solid material and the guide structure a confinement layer having a refractive index lower than the refractive index of the active material; and G) depositing a upper electrode above the confinement layer in the modulation region.

15. The method of claim 14, wherein step D) further comprises etching the guiding layer to form a recess constituting part of said cavity.

16. The method of claim 14, comprising the further step of, previous to step A), depositing a buffer layer on the substrate, and in step A) of which the lower electrode is deposited on the buffer layer.

17. The method of claim 14, comprising the further step of, previous to step D), depositing within the cavity a material having a refractive index higher than the refractive index of the guiding layer and the refractive index of the active solid material.

* * * * *